(12) United States Patent
Alder

(10) Patent No.: US 6,976,693 B2
(45) Date of Patent: Dec. 20, 2005

(54) TRAINING WHEELS

(76) Inventor: Kenneth Alder, 12 Riversville Rd., Greenwich, CT (US) 06831

( * ) Notice: Subject to any disclaimer, the term of this patent is extended or adjusted under 35 U.S.C. 154(b) by 0 days.

(21) Appl. No.: 10/797,283

(22) Filed: Mar. 10, 2004

(65) Prior Publication Data

US 2005/0200097 A1    Sep. 15, 2005

(51) Int. Cl.[7] .................................................. B62H 1/00
(52) U.S. Cl. ..................................... 280/302; 280/767
(58) Field of Search ................................ 280/301, 302, 280/293, 767

(56) References Cited

U.S. PATENT DOCUMENTS

| | | | |
|---|---|---|---|
| 1,054,237 A | * | 2/1913 | Phelan ........................ 280/302 |
| 2,220,528 A | * | 11/1940 | Kutil ........................... 280/7.15 |
| 3,746,367 A | | 7/1973 | Johannsen |
| 4,615,535 A | | 10/1986 | McMurtrey |
| 4,810,000 A | | 3/1989 | Saunders |
| 5,242,183 A | | 9/1993 | Oberg et al. |
| 6,296,266 B1 | * | 10/2001 | Martin ........................ 280/293 |
| 6,412,805 B1 | * | 7/2002 | Chen .......................... 280/302 |
| 6,769,708 B2 | * | 8/2004 | Ackerly ...................... 280/295 |

* cited by examiner

*Primary Examiner*—Kevin Hurley
(74) *Attorney, Agent, or Firm*—Stephen E. Feldman, PC

(57) ABSTRACT

A training wheel frame is disclosed comprising a stem, where the stem has an upper and lower end. The upper end is capable of being connected to a bicycle frame. The frame has left and right side tubes, where each of the side tubes has a front end. The front end of each side tube is connected to the lower end of the stem. The left and right side tubes are of the frame are incapable of separately rotating about the lower end of the stem, and the left and right tubes being capable of pivoting about the front end of the tubes to place training wheels between the ground and the chain stay tubes of the bicycle frame.

12 Claims, 3 Drawing Sheets

TRAINING WHEELS

FIELD

The invention relates to bicycle accessories and more particularly to a mechanism for attaching training wheels to a bicycle frame.

BACKGROUND

Persons of any age, whether a child or an adult, often learn to ride a bicycle by attaching a pair of training wheels to the bicycle. As the rider builds their coordination and balance, they rely proportionally less on the balance and support provide by the training wheels. Over time, the rider becomes competent in riding on two wheels, and the training wheels can be removed from the bicycle.

U.S. Pat. No. 3,746,367 to Johannsen discloses retractable training wheels having a left and a right retractable mechanism and a left and right training wheel attached to the respective mechanism. In Johannsen, the left mechanism is retractable independently from the right mechanism. Accordingly, an unwanted unbalance might occur if one wheel retracts more than another wheel. Upon retracting the wheels, the mechanism is closer to the ground than either training wheel, preventing the wheels from contacting the ground. Accordingly, as soon as each training wheel is retracted, neither training wheel is able to assist to the rider.

U.S. Pat. No. 4,615,535 to McMurtrey discloses a pair of training wheels and a pair of mechanisms for attaching the training wheels to the bicycle. Each training wheel is independently adjustable on each respective mechanism for the purpose of accommodating different bicycle sizes. Accordingly, if one wheel were retracted more than the other wheel, and unwanted unbalance would result.

McMurtrey teaches that each mechanism extends downwardly, below the chain stay tubes of the bicycle. The mechanisms are required to extend below the chain stay tubes so that the training wheels can be adjusted to fit various sized bicycles. The amount of extension past the chain stay tubes prevents raising the training wheels close to the chain stay tubes for allowing a rider to rely less on the training wheels while building balance and coordination.

U.S. Pat. No. 4,810,000 to Saunders teaches a pair of training wheels and a pair of mechanisms for attaching the training wheels to the bicycle. Each mechanism is required to move independently so that each wheel can provide opposing support when bicycle is driven around a turn. An inherent instability is created because the wheels allow the bicycle to become unbalanced, tipping the rider off of the bicycle.

U.S. Pat. No. 5,242,183 to Oberg, et al, teaches attaching a mechanism for holding support wheels to a bicycle. The support wheels serve the purpose of supporting the bicycle while a rider is "popping wheelees." In order to provide the appropriate support, the support wheels are rigidly elevated above the rear hub of the bicycle, extending rearward, beyond the rear frame tubes of the bicycle. The mechanism has a unshaped frame member that attaches to the rear hub of a bicycle and is adjustable to accommodate sizing for different bicycles. The support wheels are capable of being shifted in a direction that is mostly parallel to the long axis of the bicycle to give the rider more or less support when popping a wheelee. In order to handle the continue shock placed on the support wheels, the mechanism must be supported in two locations on the bicycle frame.

Each prior art reference fails to teach a retractable mechanism that is incapable of separately positioning each training wheel towards or away form the ground to avoid unwanted unbalancing. Each prior art also fails to teach a mechanism that allows the training wheels to be pivoted for placing the wheels between the ground and the chain stay tube so that the wheels can be adjusted while the rider builds confidence and balance. Each prior art also fails to teach a mechanism for holding training wheels that is capable of attaching to the bicycle with one bolt.

SUMMARY

A training wheel frame is disclosed comprising a stem, where the stem has an upper and lower end. The upper end is capable of being connected to a bicycle frame. The frame has left and right side tubes, where each of the side tubes has a front end. The front end of each side tube is connected to the lower end of the stem. The left and right side tubes are of the frame are incapable of separately rotating about the lower end of the stem, and the left and right tubes being capable of pivoting about the front end of the tubes to place training wheels between the ground and the chain stay tubes of the bicycle frame.

BRIEF DESCRIPTION OF THE FIGURES

In order that the manner in which the above recited objectives are realized, a particular description of the invention will be rendered by reference to specific embodiments thereof that are illustrated in the appended drawings. Understanding that the drawings depicts only typical embodiments of the invention and are not therefore to be considered to be limiting of its scope, the invention will be described and explained with additional specificity and detail through the use of the accompanying drawings in which.

DESCRIPTION OF THE EMBODIMENTS

Figure 1:
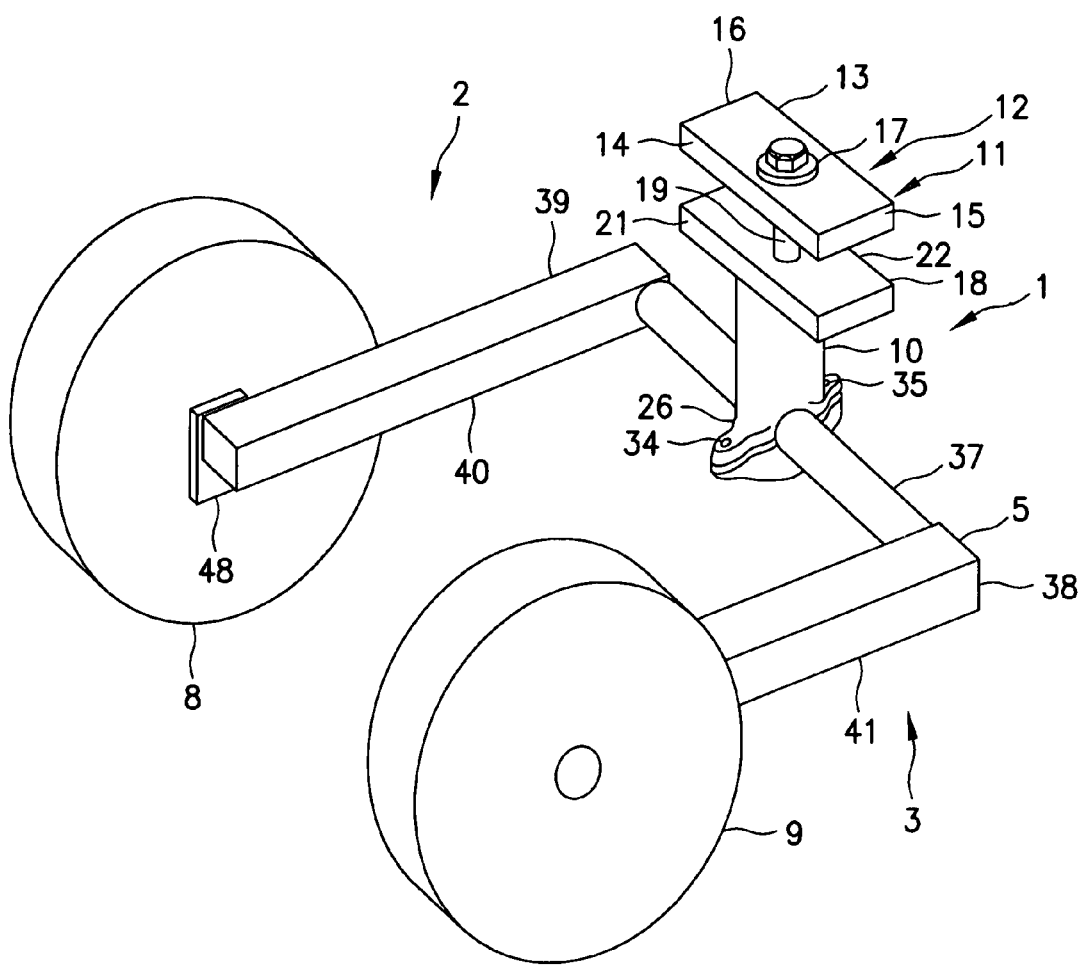
FIG. 1 illustrates a mechanism for attaching a pair of training wheels to a bicycle, including wheels, a structural member and a stem.

A mechanism is disclosed for attaching training wheels to a bicycle. The mechanism enables the simultaneous positioning of each training wheel and prevents the separate positioning of each training wheel. The mechanism allows the training wheels to be placed between the chain stay tubes and the ground as desired by the rider for allowing the rider to receive more or less assistance by the training wheels. The mechanism is further capable of being attached to or removed from the bicycle by a single bolt.

The mechanism 1 comprises left and right segments 2 and 3, each segment having a front end 4 and 5 and a rear end 6 and 7. The front end of each segment 4 and 5 attaches to the bicycle, and the rear end of each segment attaching to a training wheel 8 and 9. Each segment 2 and 3 is capable of being simultaneously pivoted about the front end 4 and 5 and incapable of being pivoted separately about the front end 4 and 5. The pivoting of the mechanism serves to position the training wheels 8 and 9 towards and away from the ground as desired by the rider to add or remove assistance from the wheels 8 and 9. Preventing the training wheels from separately pivoting avoids a potential unbalancing of the training wheels.

Figure 2:
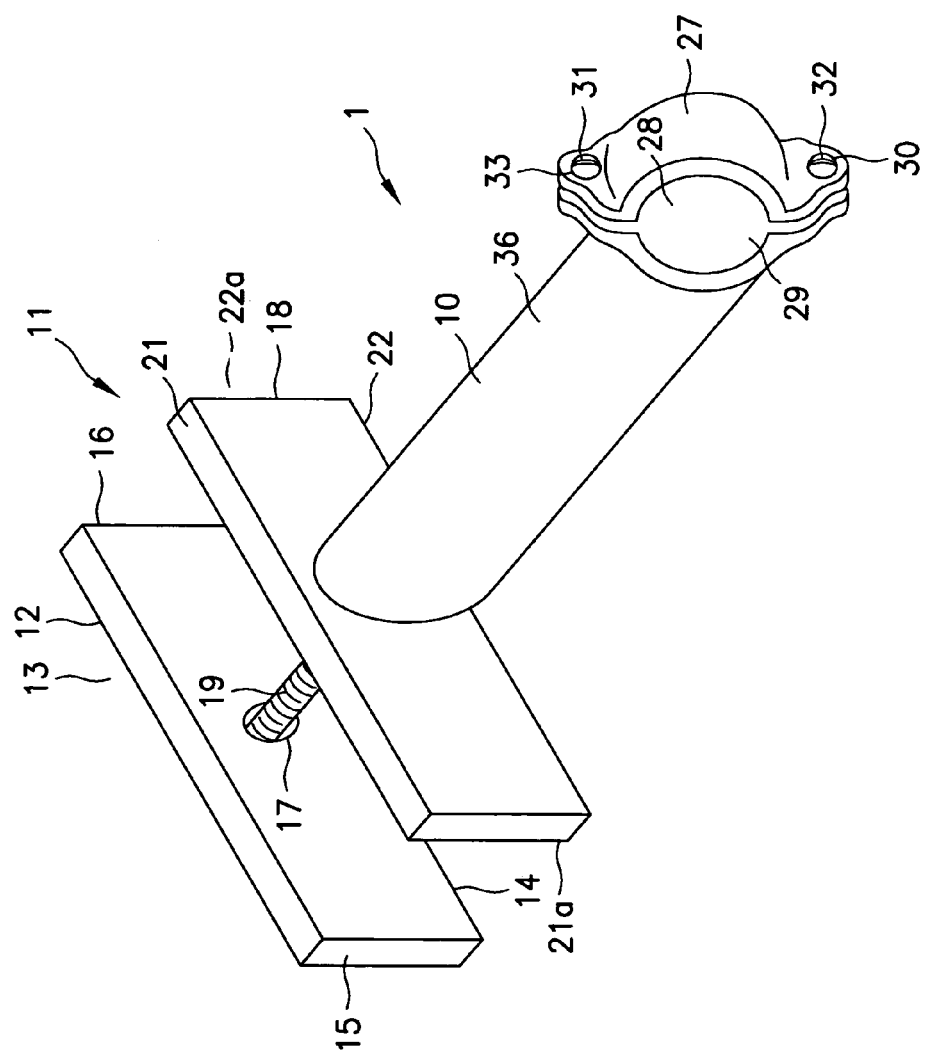
FIG. 2 illustrates the stem for attaching the structural members to the bicycle.

Referring to FIGS. 1 and 2, the mechanism 1 has a stem 10. The stem 10 connects the left and right segments 2 and 3 to the bicycle frame. The stem 10 is fabricated from carbonated steel, aluminum or titanium.

The stem 10 has a top end having a clamp 11 which connects the stem 10 to the bicycle frame. The clamp 11 is capable of gripping a kickstand bracket or chain stays on the bicycle. The clamp 11 is fabricated from the same material as the stem 10.

The clamp 11 has a top member 12 that fits over the top of the kickstand bracket and a bottom member 18 that fits under the bottom of the kickstand bracket. The members 12 and 18 has first and second parallel edges 13 and 14. When the top member 12 is placed on the kickstand bracket, the edges 13 and 14 project perpendicular to the long axis of the chain stay tubes. The edges 13 and 14 are long enough to extend over the kickstand bracket. The edges 13 and 14 are short enough to not extend beyond the kickstand bracket or the chain stay tubes, which ever is the shorter.

The top member of the clamp 12 has third and forth parallel edges 15 and 16. When the top member 12 is placed on the kickstand bracket, the edges 15 and 16 project parallel to the long axis of the chain stay tubes. The edges 15 and 16 are long enough to extend over the kickstand bracket without extending beyond the rear edge of the kickstand bracket or the lipped end of the front of a typical kickstand bracket.

The top member 12 has a thickness 16 that is uniform throughout the top member 12. The volume of the top member 12 provides the top member with the strength to withstand compressive and shear stresses applied to the clamp 11 while the training wheels are assisting a person on a bicycle.

The top member 12 has a through-hole 17. When the top member 12 is seated against the kickstand bracket, the hole 17 is positioned to fit against a standard through-hole in the kickstand bracket. The hole 17 is large enough to allow a bolt 19 to pass through the top member 12 and the kickstand bracket, but small enough to provide a seat for the nut (not shown) required for tightening the bolt 19. In use, the bolt 19 is placed through the clamp 12, passing through the kickstand bracket and exiting through the threaded bottom member 18. The bolt 19 is then tightened against a nut and the stem 111 becomes rigidly attached to the bicycle.

The clamp 11 has a bottom member 18. The bottom member 18 is shaped to fit against the bottom member of the kickstand bracket. The bottom member 18 is rigidly attached to the stem 10 via, for example, a weld connection. The connection between the bottom member 18 and the stem 10 assures that the clamp 11 will not move when the training wheels 8 and 9 are used to support a rider.

The bottom member 18 has first and second parallel edges 21 and 22. The edges have the same length as edges 13 and 14 and are separated by the same distance as edges 13 and 14. When placed against the kick stand bracket, the edges 21 and 22 are parallel with edges 13 and 14 to create a firm grip against the bottom of the kickstand bracket.

The bottom member 18 has parallel edges 21a and 22a. The edges have the same length as edges 15 and 16. The edges complete a surface area of the bottom member 18, where the surface area 18 is equivalent to the surface area of the top member 12. The equivalent surface area between the members 12 and 18 further ensures a firm grip about a kickstand bracket.

The thickness of the bottom member 18 is equivalent to the thickness of the top member 12. The material thickness assures that neither the bottom or top member 12 or 18 bends, tears, stretches or otherwise deforms or fails during standard use.

The bottom member 18 has a threaded hole 24. The hole 24 is dimensioned so that upon placing the top clamp 11 against the kickstand, the threaded hole 24 fits against the through-hole of the top member 17 and the through hole of the kickstand. The threads of the hole 24 continue into the stem 10 for enabling the tightening of the bolt 19 against the stem 10. The bolt 19 and washer nut are capable of being tightened with a standard ratchet wrench.

In use, the clamp 11 is placed on the kickstand bracket (FIG. 3) in place of a kickstand, where the clamp 11 is tightened to have a rigid connection with the kickstand bracket. The kickstand is not needed when the training wheels are used. Rather, the bicycle is kept in an upright position because due to the contact between the ground, the training wheels 8 and 9 and the front and rear wheels of the bicycle.

It should be noted that some bicycles are manufactured without kickstand brackets. In such an event, the clamp would fit between the crank set and the cassette on the chain stay tubes, and closer to the crank set. In such circumstances, the clamp 11 would be tightened against the chain stays of the bicycle. In this situation, the top member 12 would be altered to provide the same lip advantage of the kickstand. For example, groves coincident to the chainstay axes would be carved into the member 12. Alternatively, a plate would be welded to the member 12 that spans the void between the chain stays. Such a plate would prevent the turning motion of the clamp 11 during normal use.

Referring to the FIGS. 1 and 2, the stem 11 has a bottom end having a binder tube 25. The binder tube 25 has a top section 26 and a bottom section 27. The top and bottom section 26 and 27 each have a semi-circular depression 26a (not shown) and 27a in their respective cross sectional areas. The semi-circular depressions 26a and 27a are positioned to align with each other when the top section 26 is placed against the bottom section 27. The combination of the semi-circular cross sections 26a and 27a forms a cylindrical shaft.

The top section 26 and bottom section 27 each have an inner opposing face 28 and 29. The surface area of the face on the top section 28 is a mirror image of the opposing face on the bottom section 29. When the top section 26 is placed against the bottom section 27, the edges of each opposing face 28 and 29 are coincident. The edge alignment assures that material from the top section 26 will not hang over the material of the bottom section 27. Each face 28 and 29 is contoured around the cylindrical shaft and around a pair of binder fittings 30 and 31, discussed below.

The bottom section 27 has binder fittings 30 and 31 which form of a pair of through-holes. The through-holes 30 and 31 are large enough to allow binder bolts 32 and 33 to pass through without gripping the teeth of the bolts 32 and 33.

The through-holes 30 and 31 contain countersink holes which prevent the protrusion of the head of either bolt 32 and 33 from the binder tube 25. Guarding the head of each bolt 32 and 33 from exterior elements serves to prevent accidental turning and loosening of the bolts 32 and 33 while a person is using the training wheels 8 and 9. Guarding the bolt heads thus prevents the unwanted pivoting of the training wheels 8 and 9 about the stem 11.

The top section 26 has thread holes 34 and 35. The thread holes are positioned so that when the top section 26 is placed against the bottom section 27, the thread holes 34 and 35 are in line with the through-holes 30 and 31 of the bottom section 27. The threaded holes 34 and 35 have a diameter that is capable of being threaded against the binder bolts 32 and 33.

The type of threads within the thread holes 34 and 35 allow each binder bolt to withstand continual usage of the mechanism by a rider. The threads and binder bolt combination form a compression fitting that is capable of adjustment with a hex-key found on an Allen Wrench.

Figure 3:
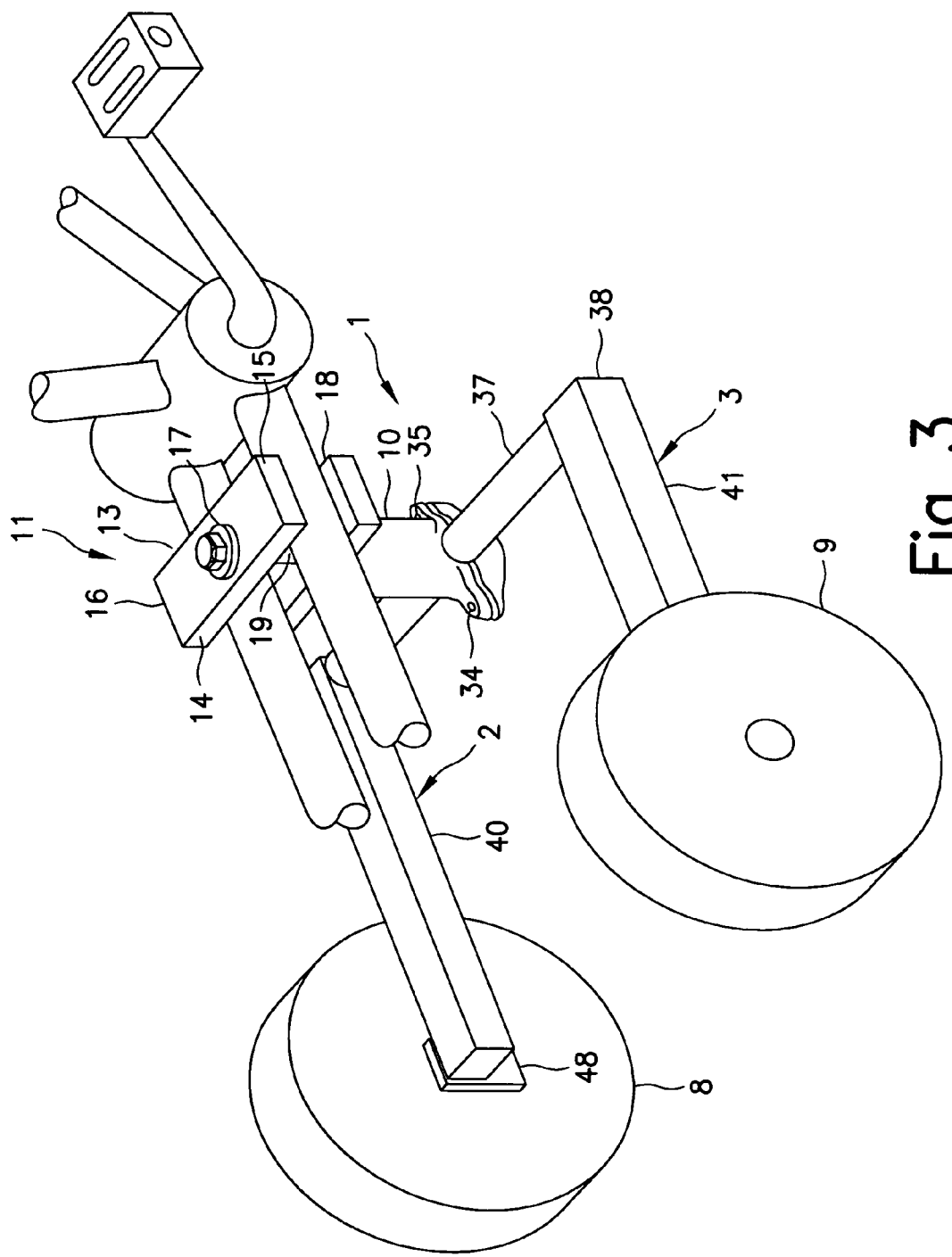
FIG. 3 illustrates the mechanism attached to a kick stand bracket of a bicycle.

In use, the binder bolts 32 and 33 are passed through the through-holes 32 and 33 in the bottom section and are threaded in the thread holes 34 and 35 (FIGS. 1 and 3). The bolts 32 and 33 are tightened so that the head of each bolt 32 and 33 rests within each countersink hole. At this time, the cylindrical shaft formed by the binder tube 25 rigidly binds a tube within the binder tube 25, preventing any pivoting or translating of the tube within the binder tube 25.

Referring back to FIGS. 1 and 2, the stem 11 has an extension tube 36. The extension tube defines the distance between the clamp 11 and the binder tube 25. The cross sectional shape of the extension tube 36 provides the tube with enough strength to resist shearing, bending or compressive forces exerted on the mechanism while the training wheels assist a rider.

The extension tube 36 is long enough to lower the left and right segments 2 and 3 away from the kickstand bracket. Lowering the segments 2 and 3 allows the mechanism 1 to be minimally obstructed by the chain stay tubes, the crank set, or the pedals of the bicycle. The extension tube 36 is short enough to prevent a bottom surface of the mechanism 1 from extending past the lowest position of the crank set. The length of the extension tube 36 is restricted to prevent road obstacles from damaging the mechanism 1.

Turning back to FIG. 1, the mechanism has a front tube 37. The front tube 37 connects the first and second segments of the mechanism 2 and 3. The front tube 37 has a circular cross section that is dimensioned to fit within the cylindrical opening in the binder tube 25. The center of the front tube 37 is coincident with the center of the opening in the binder tube 25. This connection stabilizes the mechanism during normal use. The tube is fabricated from steel and the thickness of the tube 37 is enough to handle the shear and bending stress placed on the tube 37 when the rider uses the training wheels to assist in riding the bicycle.

The diameter of the front tube 37 is large enough so that upon tightening the binder bolts 32 and 33, the circular tube 37 is fixed within the binder tube 25. The diameter of the front tube 37 is small enough so that when the binder bolts are loosened in the binder fittings 30 and 31, the front tube 37 freely rotates within the binder tube 25.

The front tube 37 has a right end 38 and a left end 39. The right end of the front tube 38 is rigidly connected to the front end 4 of the right segment, and the left end of the front tube 39 is rigidly connected to the front end 5 of the left segment of the mechanism. The rigid connection between the tube ends 38 and 39 and the right and left segments 2 and 3 is created by welding. The connection prevents any motion between the front tube 37 and the right and left segments 2 and 3 when the rider is assisted by the training wheels 8 and 9.

The tube 37 is long enough to prevent any contact between the right and left segments 2 and 3 and the chain stay tubes of the bicycle.

Each end 38 and 39 projects away from the center of the tube, where the projection is perpendicular to the center axis of the bicycle and parallel to the ground. The projected distance to each end 38 and 39 stabilizes the bicycle and ensures that the rider will not tip over when the training wheels 8 and 9 are placed against the ground.

The left and right segments 2 and 3 each have a main tube 40 and 41 that extends between the front and rear ends of the segments 2 and 3. Each main tube 40 and 41 has a length that places the spin axis of each training wheel substantially in line with the spin axis of the rear wheel of the bicycle. The length of each tube 40 and 41 is enough to provide substantial leverage to a rider who grips the wheels 8 and 9 for adjusting the position of the training wheels 8 and 9.

Each main tube 40 and 41 is attached to the front tube 37 so that, from a side perspective, the long axis of main tube 40 is parallel to the long axis of main tube 41. The tubes 40 and 41 are also attached so that, when viewing from a top perspective towards the rear of the bicycle, the long axis of the main tube 40 is either parallel with or diverging from the long axis of the main tube 41.

A diverging axis between the main tubes 40 and 41 assists in spreading the tubes 40 and 41 away from the rear wheel of the bicycle. Spreading the tubs 40 and 41 from the rear wheel protects the rear tire, the chain stay tubs, and the cassette from unwanted interaction with the tubes 40 and 41. Accordingly, pivoting the tubes about the front tube 37 enables the rider to place the training wheels 8 and 9 at substantially any location between the ground and the chain stay tubes. Spreading the tubes 40 and 41 from the rear wheel also pushes the training wheels 8 and 9 outwardly from the center of gravity for the bicycle, increasing the tipping stability offered by the training wheels 8 and 9.

The tubes 37, and 40 are shaped to accommodate the bending and shearing stress applied to the tubes during normal use of the training wheels by a rider. To handle the required loads, the tubes may have a square or circular cross section, and the tubes may be solid or have a predetermined wall thickness.

Each tube 40 and 41 has a bracket for mounting a training wheel 48 and 49. Each bracket 48 and 49 is designed to accommodate the bending and shearing stress applied to the bracket 48 and 49 during normal use of the training wheels 8 and 9. The brackets 48 and 49 are each rigidly connected to each tube 40 and 41 to prevent independent motion of either bracket 48 and 49 when the rider is assisted by the training wheels 8 and 9. For example, each bracket 48 and 49 is welded to the respective tube 40 and 41.

The brackets 48 and 49 each have a mounting hole through which a training wheel bolt 50 and 51 is passed to grip the bearing of each training wheel 8 and 9. Upon the gripping of each training wheel, the training wheels 8 and 9 are restrained from translating away from either bracket 48 and 49 and each training wheel 8 and 9 is allowed to rotate freely.

In use, the front tube 37 is placed within the binder tube 25 and the binder tube 25 is tightened by tightening the binder bolts 32 and 33. Some slack is left in the binder bolts 32 and 33 to allow the rider to adjust the left and right segments while positioning the training wheels. For example, as disclosed in FIG. 3, the training wheels may be raised or lowered because the rider is attempting to ride with less or more assistance from the wheels. After placing the training wheels in the desired position, the binding bolts 32 and 33 are tightened and the training wheels are fixed in place relative to the bicycle. At this point, the rider is capable of riding on the bicycle while being assisted by the training wheels 8 and 9.

Accordingly, a mechanism 1 has been disclosed for attaching training wheels 8 and 9 to a bicycle. With the binding tube 25, the mechanism 1 is incapable of separately positioning each training wheel 8 and 9 towards or away from the ground. With the kickstand clamp 12, the mechanism 1 is capable of being attached to a bicycle with the use of one bolt.

The present invention may be embodied in other specific forms without departing from its spirit or essential characteristics. The described embodiments are to be considered in all respects only as illustrative and not as restrictive. The scope of the invention is, therefore, indicated by the appended claims and their combination in whole or in part rather than by the foregoing description. All changes that come within the meaning and range of equivalency of the claims are to be embraced within their scope.

I claim:

1. A training wheel frame, comprising:
   a stem, the stem having an upper and lower end, the upper end capable of being connected to a bicycle frame and the lower end being connected to a front tube; and
   a left side tube and a right side tube, each of the side tubes having a front end and a rear end, the front end of each side tube being in rigid communication with the front tube, and the rear end of each side tube being in communication with a wheel,
   whereby the left and right tubes are capable of pivoting about an axis of the front tube thereby placing the wheels at any location between the ground and the chain stay tubes of the bicycle frame.

2. The frame of claim 1, whereby the training wheel frame comprises a clamp, the clamp capable of receiving one bolt for connecting the training wheel frame to the bicycle frame.

3. The frame of claim 2 having a left training wheel and a right training wheel, each wheel being respectively connected to the rear of each respective side tube, each wheel being capable of rotating about the rear end of each respective side tube.

4. The frame of claim 3 wherein the top of the stem is capable of connecting to a pair of bicycle chain stays.

5. The frame of claim 3 wherein the rear end of each side tube extends rearward of the front end by a distance being not greater than the length of chain stay tubes.

6. The frame of claim 5 wherein the front tube has a first and second outer edges and a center, the center of the front tube being connected to the bottom of the stem, the center of the front tube capable of pivoting within the bottom of the stem, where the front of each side tube being rigidly connected to the outside edge of the front tube.

7. The frame of claim 6 comprising a compression fitting, the compression fitting connecting the front tube to the stem.

8. The frame of claim 7 where the front tube is welded to the side tubes.

9. The frame of claim 8 where the axis of rotation of the front tube being parallel to the axis of rotation of the rear wheel of the bicycle.

10. The frame of claim 9 wherein the clamp is capable of mounting to a bicycle without a kickstand bracket, said clamp having means for preventing the rotation of the clamp.

11. The frame of claim 3 wherein the top of the stem is capable of connecting to a kickstand bracket.

12. The frame of claim 1 wherein the front tube and the side tubes are a continuous U-shaped tube.

* * * * *